United States Patent [19]

Cleverdon

[11] Patent Number: 4,502,864
[45] Date of Patent: Mar. 5, 1985

[54] CROWN ETHER COMPLEXES OF DIRECT YELLOW 11 AND DYESTUFF CONTAINING SAME

[75] Inventor: Jo Ann Cleverdon, Mobile, Ala.

[73] Assignee: Ciba-Geigy Corporation, Ardsley, N.Y.

[21] Appl. No.: 603,863

[22] Filed: Apr. 25, 1984

[51] Int. Cl.³ .............................................. D06P 67/00
[52] U.S. Cl. .......................................... 8/527; 8/609; 8/681; 8/526; 8/648; 8/918; 8/919; 534/576
[58] Field of Search ........................... 8/527, 609, 681; 260/208

[56] References Cited

U.S. PATENT DOCUMENTS 3,562,295  2/1971  Pedersen ......................... 260/245.72
3,905,949  9/1975  Perkins et al. ....................... 260/205
3,997,562  12/1976  Liotta .................................. 549/351
4,197,242  4/1980  Gunther .......................... 260/245.85
4,310,331  1/1982  Arsac et al. ............................. 8/527

FOREIGN PATENT DOCUMENTS 1160625  1/1984  Canada .
2820487  11/1979  Fed. Rep. of Germany .
3046450  8/1981  Fed. Rep. of Germany .
1480712  7/1977  United Kingdom .

Primary Examiner—A. Lionel Clingman
Attorney, Agent, or Firm—Karl F. Jorda

[57] ABSTRACT

Liquid concentrate of Direct Yellow 11 based on the crown ether complexes of tetrasodium direct yellow 11, are described as well as these novel soluble chelates of insoluble tetrasodium complexes of Direct Yellow 11.

6 Claims, No Drawings

CROWN ETHER COMPLEXES OF DIRECT YELLOW 11 AND DYESTUFF CONTAINING SAME

BACKGROUND OF THE INVENTION

This invention relates to a process for preparing concentrated stable liquid dye solutions of CI Direct Yellow 11 (Paper Yellow 11). Paper Yellow 11 is an intense yellow stilbeneazo(xy) dye that is very substantive to cellulose. The structure assigned to this dyestuff is

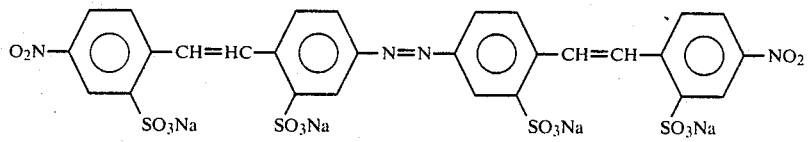

It is produced by a well known and well publicized process. The industrial process was described in BIOS Report 1548 after World War II. It is based on the self-condensation of 5-nitro-ortho-toluene sulfonic acid in the presence of a concentrated alkali metal hydroxide solution. The products obtained are the alkali metal complexes of the stilbeneazo(oxy) dye.

The 5-nitro-ortho-toluene sulfonic acid is neutralized by the base, usually sodium hydroxide and the solution is heated to 50°–90° C. for several hours to promote the condensation. The excess base is neutralized with sulfuric or hydrochloric acid. The dye is filtered from the reaction mass. It is marketed as the wet cake or the cake is dried.

The neutralized dye is a sodium salt complex of the chromophore and is only sparingly soluble in water (1–5%). With other stilbene dyes the poorly soluble salts are converted to more soluble salt to achieve improved solubility. This would be accomplished by precipitating the chromophore in its free acid form by the addition of acid. This free acid form is then converted to a more soluble salt by dissolving it in an appropriate base. However, this standard method for improving solubility to form dye solutions is inappropriate for Paper Yellow 11 (Direct Yellow 11) as its free acid form has extremely poor filtration characteristics. The salts formed during the acid neutralization with sulfuric or hydrochloric acid (sodium sulfate or sodium chloride) form a viscous slime. This slime could not be filtered using conventional equipment. Because of this filtration problem, the salts could not be removed from the resultant wet cake. Removal of the salt is necessary for the formation of liquid Paper Yellow 11 concentrates.

Concentrates of Paper 11 are desireable for pulp dyeing in paper manufacture, but such concentrates have not been readily available.

There have been several methods proposed heretofore for obtaining the desired Paper Yellow 11 concentrates. They have primarily been based on redesign of the condensation reaction to directly provide the dye as a concentrated aqueous solution. These methods have had several shortcomings due either to instability of the final product during industrial storage and economical or ecological drawbacks.

U.S. Pat. No. 3,905,949 issued in 1975 to E. I. duPont (DRP 1,644,308) describes a method of condensation in which the alkali metal base is lithium hydroxide. The final product is a highly concentrated, water-soluble dye paste. This soluble lithium salt complex is more substantive than the sodium salt complex. The disadvantage of this lithium-based paste product is that it does not form sufficiently stable dye solutions. On storage, the concentrated solutions within a short time, at elevated temperatures, formed gels and tended to crystallize or flocculate at slightly below room temperature (5°–15° C.). Such problems with "pot life" seriously interfere with industrial use of this invention.

It has also been proposed, in German Offenlegungsschrift No. 2,820,487, that the base-catalyzed 4-nitrotoluene-2-sulfonic acid be carried out in the presence of the reaction products of ammonia and ethylene oxide, sodium or lithium hydroxide. In German Offenlegungsschrift No. 3,046,450 this condensation takes place in the presence of a primary, secondary or tertiary amine and lithium hydroxide. It has been noted that at least some of the sulfo groups on the chromophore prepared in this manner are in the form of alkali metal salts.

German Offenlegungsschrit No. 3,110,261 describes the condensation in the presence of sodium hydroxide and alkanolamines in an aqueous/alcoholic medium. The organic solvent system including glycol-ethers as well as conventional alcohols provide stable dye solutions but has been ecologically faulted for the relatively large amounts of the glycol-ethers discharged in the waste waters after paper dyeing.

Another drawback has been the reduced solubility and poor stability of concentrated dye solutions because of the salt content of the finished dye solutions. Since the condensations are carried out in strongly basic media, the neutralization of these bases produces enough salts to adversely affect the stability and solubility of the dye. Desalting steps have been proposed.

In German Offenlegungsschrift No. 2,451,219, sodium ions are precipitated (after acidification) by means of the relatively expansive hexafluorosilicic and replaced by cations which improve solubility. This method requires and additional filtration step to remove the precipitated sodium hexafluorosilicate.

European Patent Application No. 53,220 offers a method for preparing low-electrolyte dyes, by first converting the dye to lipophilic amine salt which is separated from the highly electrolytic salt-containing reaction mass. The separated lipophylic amine salt is then reacted with diethanolamine to form the diethanolammonium salt. The lipophylc amine is recovered and recycled. This method is expensive and technically complicated in that two resalting stages are included, each requiring a difficult phase separation.

It is an object of this invention to provide a process for converting the product of the standard sodium hydroxide catalyzed condensation of 5-nitro-ortho-toluene sulfonic acid to liquid, water-soluble concentrates of Paper Yellow 11 (C.I. Direct Yellow 11) that are stable for storage as concentrates and in dyeing solution dilution.

THE INVENTION

This invention is based upon the discovery that the insoluble tetrasodium complex of (CI) Direct Yellow 11 (Paper Yellow) is converted to a soluble form by the chelating action of the crown ethers, 18-crown-6 and 15-crown-5.

Because of the four sodium moieties attached to the sulfonic groups on the Paper Yellow chromophore, the tetra sodium complex is insoluble in water. Of the alkali metal complexes, only the lithium complexes are water-soluble, but their solutions are not stable over extended periods of time.

The crown ethers are recently discovered (1975) chelating agents for alkali metals (U.S. Pat. Nos. 3,562,295 and 3,998,562). They include 12-crown-4; 15-crown-5 and 18-crown-6 (CAS 294-93-9; 33100-27-5; and 17455-13-9 respectively). 12-crown-4 ether is a specific chelating agent only for lithium; the others can chelate the other alkali metals as well. Their formulae are as follows;

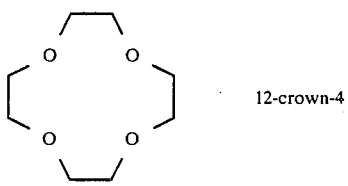

12-crown-4

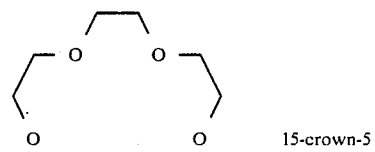

15-crown-5

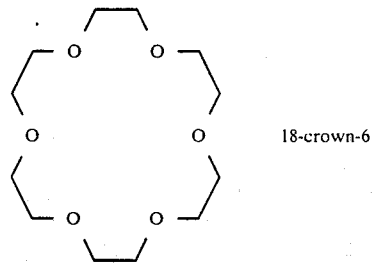

18-crown-6

While these ethers are not inexpensive, they provide a means for preparing strong tinctorial concentrates of the Paper Yellow chromophore for standardization.

The liquid concentrates of this invention are preferably prepared with 40 wt% aqueous solutions of 18-crown-6 ether. Such solutions chelate and solubilize up to about 30 wt% of the tetrasodium Paper 11 complexes according to the following equation:

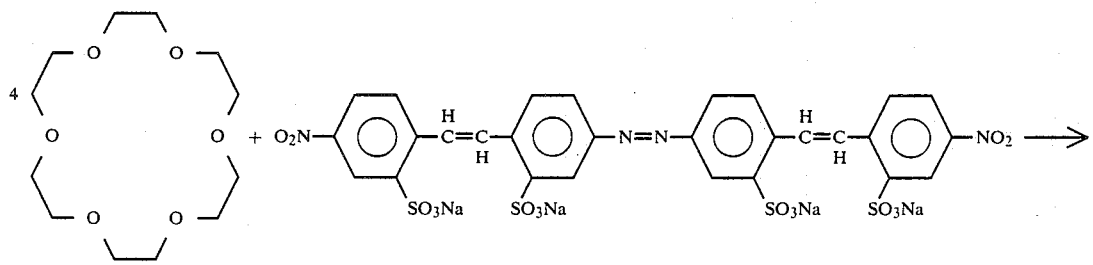

18-crown-6          Powdered Direct Yellow 11

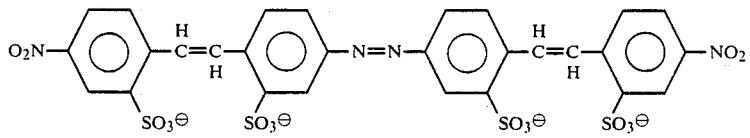

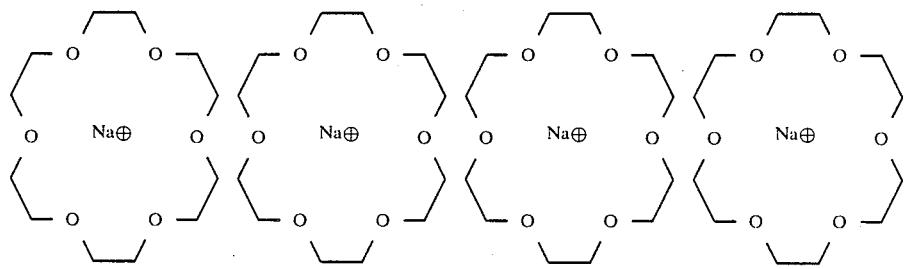

Liquid Direct Yellow 11

The other crown ethers are not as efficient in solubilizing the tetrasodium Paper Yellow.

The process will be described more fully in the examples. It is to be understood that the procedures are illustrative of the preferred mode but are merely examplary. Changes in scale, art-recognized equivalent substitutes for the starting materials and/or reactants are intended as long as they fall within the ambit of the current status of the art and within the ambit of the disclosure.

EXAMPLE 1

Three parts of Direct Yellow 11 as the dry powder (or a corresponding amount of the wet cake), six parts of water and four parts of 18-crown-6 ether are heated to about 50°–80° C. until all the Direct Yellow 11 dissolves to give a stable liquid dyestuff with 300 parts strength and absorbence λmax 417 nm. This is the standard shade for comparison. The 18-crown-6 ether forms a strong complex with the sodium cation. The removal of the sodium cation causes formation of the liquid dye in concentrated form. The concentrate is stable. There is no precipitation after 9 months storage at about 25° C. nor two weeks accelerated ageing at 5° C.

What is claimed is:

1. A process for the preparation of liquid CI Direct Yellow 11 (Paper Yellow) in stable form from the tetrasodium Paper Yellow complex in reaction mass, filter cake or dry powder form of the base-catalyzed condensation reaction of 4-nitrotoluene-2-sulfonic acid which comprises the steps of suspending the tetrasodium Paper 11 complex in an aqueous medium containing a sodium-complexing agent selected from the group consisting of 18-crown-6 and 15-crown-5 ether; heating said suspension until completely dissolved; then removing sufficient water to adjust the liquid product to the desired dye concentration.

2. The process according to claim 1 wherein said sodium complexing agent is 18-crown-6.

3. The method of dyeing paper which comprises the steps of adding the liquid product prepared according to the process of claim 1 to an aqueous dye-bath; impregnating a fibrous cellulosic material in pulp or foil form with said dye-bath until said substantive dye affixes itself to said cellulosic fibers.

4. The 18-crown-6 ether complex of Direct Yellow 11, alkali metal.

5. The 15-crown-5 ether complex of Direct Yellow 11 alkali metal.

6. The 18-crown-6 ether complex of tetrasodium Direct Yellow 11.

* * * * *